United States Patent [19]

Liu et al.

[11] 4,182,052
[45] Jan. 8, 1980

[54] EDUCATIONAL TOY

[76] Inventors: Hsing-Ching Liu; Lan-dih Liu, both of 3F, No. 213, Chung Ching N. Rd., Sec. 4, Taipei, Taiwan

[21] Appl. No.: 925,929

[22] Filed: Jul. 19, 1978

[51] Int. Cl.² .............................................. G09B 3/00
[52] U.S. Cl. .................................................... 35/9 R
[58] Field of Search .............. 35/9 R, 48 R; 273/109, 273/113

[56] References Cited
U.S. PATENT DOCUMENTS

| | | | |
|---|---|---|---|
| 2,190,881 | 2/1940 | Palmer | 35/9 R |
| 2,311,217 | 2/1943 | Emmert | 35/48 R |
| 2,525,738 | 10/1950 | Tormey | 273/126 A |
| 2,563,608 | 8/1951 | Laufer | 273/109 |
| 4,027,402 | 6/1977 | Liu et al. | 35/9 R |
| 4,049,265 | 9/1977 | Mackie | 35/9 R X |

Primary Examiner—William H. Grieb

[57] ABSTRACT

An educational toy comprises a base provided with a plurality of passages having a V-shaped cross-section, a lid having a plurality of openings corresponding to each said passage, and a series of replaceable question and answer combination cards having one opening at each question and answer illustration section. The quiz results are indicated by the rolling of at least one bead.

10 Claims, 4 Drawing Figures

EDUCATIONAL TOY

The present invention relates to a novel educational toy.

The novel educational toy according to the present invention mainly comprises a base provided with a plurality of passages each having V-shaped cross-section, a lid having a plurality of openings corresponding to each said passage, and a series of replaceable question and answer combination cards divided into various corresponding question and answer illustration sections, each having one opening aligned with one of said openings in said lid when the card is inserted thereon. One or more beads may be used which is dropped into the opening in anyone of said question sections the result that whether or not said bead rolls out from the opening in a selected answer section indicates said answer being either affirmative or negative.

It is, accordingly, the main object of the present invention to provide an aforementioned educational toy of novel construction.

Other objects and advantages will become apparent from the following description with reference to the accompanying drawings, in which.

Figures 1, 2:
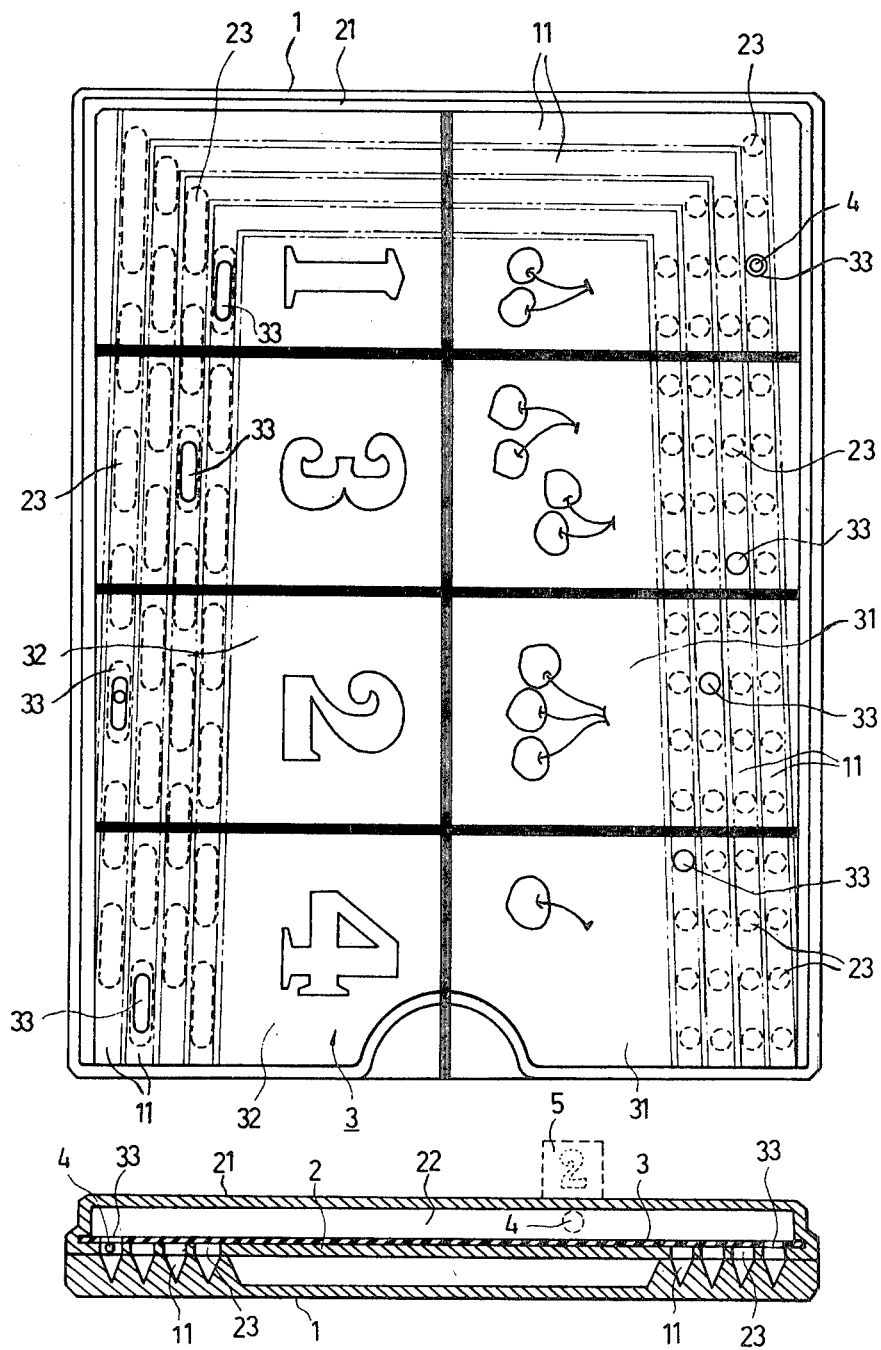
FIG. 1 is a top view of a first preferred embodiment according to the present invention.
FIG. 2 is a transverse cross-sectional view of FIG. 1.

Now, with reference to FIGS. 1 and 2 of the drawings, a first embodiment of the novel educational toy according to present invention mainly comprises a base 1, a lid 2, a question and answer combination card 3 and at least one bead 4.

The base 1 is provided with a plurality of passages 11 each having a V-shaped cross-section, four passages 11 being illustrated but not necessary being limited to the illustrated model. The passages 11 are extended longitudinally in parallel around the sides of said base 1, but inclined with respect to the marginal edge of said base 1 for facilitating the rolling of the bead 4 as referred hereinafter.

The lid 2 is formed with a shell 21 to define a chamber 22 therebetween. The shell 21 should be made of transparent material and may be intergrally formed with said lid 2. The lid 2 has a plurality of openings 23 distributed along the lines corresponding to said passages 11. The openings 23 in the right-hand side of FIG. 1 may be circular for dropping in the bead 4 while the same in left-hand side may be a slot type for the bead 4 to readily roll out. But the configuration of said openings is not critical and can be varied as desired.

The question and answer combination card 3 is divided into a plurality of sections, for instance, eight sections being illustrated in FIG. 1, including four question sections 31 and four corresponding answer sections 32. At each section 31 or 32 there is one opening 33 configured and sized in correspondence with to the openings 23 on said lid 2. And when the card 3 is inserted on said lid 2, each opening 33 is aligned with one of said openings 23. Said opening 33 is punched according to the combination design of said corresponding question and answer illustration on said card 3.

The bead 4 is preferably made of metal, for example, a ball bearing may be employed. And a magnet can be used to move the bead 4 to the opening 33 on a selected question section of the card 3 to start a quiz. As shown in FIG. 2, a dice 5 containing the magnet may be used for an additional game purpose.

When assembled as shown in FIG. 1, through the transparent shell 21 the illustration and openings 33 on card 3 can be clearly seen and all passages 11 as well as openings 23 are masked by said card 3.

Now, if one makes a quiz by asking a question such as "how many cherries in the last section of question series?" the child may make the answer in advance, for example, by placing the dice 5 just over the opening 33 on the second answer section illustrated with a number of "2". He then drops a bead 4 into the opening 33 in said last question section, and raises the base 1 to left the right-hand side up. The bead 4 will roll along the now inclined passage 11 rearwards and down to the answer illustration side, i.e. the left-hand side. The bead then rolls towards the front and out of the opening 33 in the second answer section into the chamber 22. In this case, the answer is affirmative and the bead is accordingly attracted by said dice 5. Thereafter, the bead 4 may be moved by displacing said dice 5 to another question section to make a second quiz. During the aforementioned quiz, if the dice is placed over any answer section other than the second one, then the bead 4 will freely roll into said chamber 22 and not be attracted by said dice 5. In this case, the answer is naturally negative.

Figure 3:
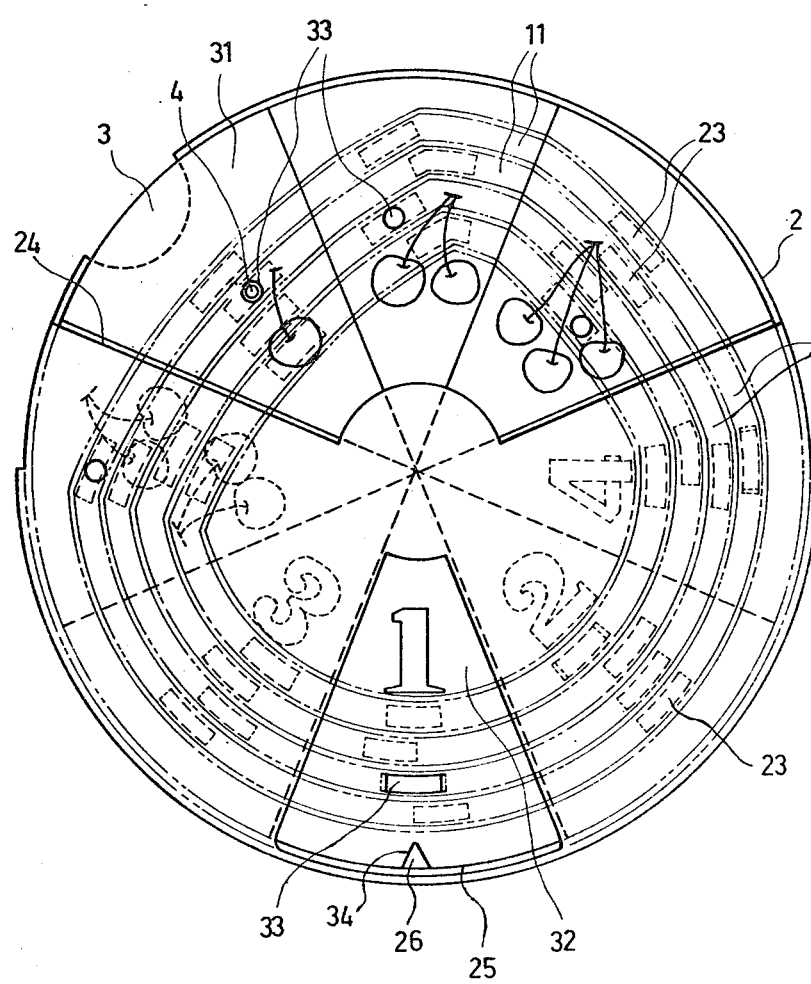
FIG. 3 is a top view of a second preferred embodiment according to the present invention.
Figure 4:
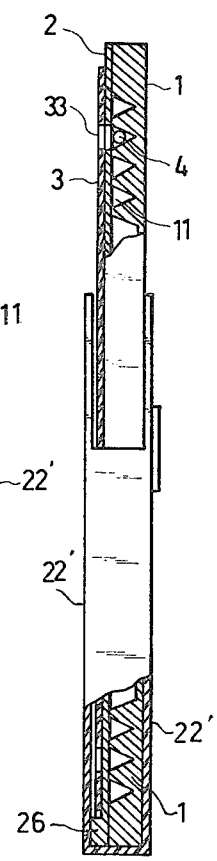
FIG. 4 is a side view of FIG. 3 partly cut away.

FIGS. 3 and 4 of the drawings show the second embodiment of the present invention, in which similar parts are indicated by the same symbol as in FIGS. 1 and 2, hence the description thereof is omitted.

In the second embodiment, the toy assembly has a circular configuration. The passages 11 are endless and formed deliberately non-circular, to avoid the possible fixed response of a child by the distance of an opening 33 from outermost edge of said toy assembly.

The shell 22' is also different from the shell 22 of the first embodiment. This shell 22' is pivotably turnably mounted over the base 1 and lid 2 sub-assembly. There is a notched sector 24 to show some question sections 31 and a window 25 to show an answer section 32. The lid 2 is provided with a set means 26 to mate with a cut 34 on the card 3 for setting the appropriate position of said card 3.

In this embodiment, there is no chamber to retain the bead 4, so that when the bead 4 is dropped into the opening 33 in the question section, it will roll out of the opening 33 in the answer section appearing inside the window 25 if the answer is affirmative, otherwise it will be obstructed by said shell 22'. The base 1 and lid 2 together with the card 3 can be turned around with respect to the shell 22' for changing the quiz.

The above embodiments are give only for illustrative purpose and not by the way of limitation. Any variations and modifications evident to those skilled in the art will fall within the scope of the attached claims.

What we claim is:

1. An educational toy comprising a base provided with a plurality of passages, a lid having a plurality of openings corresponding to said passages, a series of replaceable question and answer combination cards divided into a plurality of corresponding question and answer illustration sections, each having one opening aligned with one of said openings in said lid when the card is inserted on said lid, and at least one bead for being dropped into the opening in anyone of said question sections and rolled in the corresponding passage, whereby whether or not said bead rolls out from the opening in a selected answer section indicates if the answer selected is either affirmative or negative.

2. The educational toy as set forth in claim 1, wherein each passage has a V-shaped cross-section.

3. The educational toy as set forth in claim 1, wherein the lid is formed with a shell to define a chamber therebetween.

4. The educational toy as set forth in claim 3, wherein the shell is transparent.

5. The educational toy as set forth in claim 1, wherein the toy assembly has a rectangular configuration.

6. The educational toy as set forth in claim 1, wherein the toy assembly has a circular configuration.

7. The educational toy as set forth in claim 6, wherein a shell is provided pivotably turnable over said base and lid.

8. The educational toy as set forth in claim 7, wherein the shell has a notched sector and window.

9. The educational toy is set forth in claim 1, wherein bead is made of metal.

10. The educational toy is set forth in claim 9, wherein the means comprising a magnet is provided to attract and move said bead.

* * * * *